(12) United States Patent
Wick et al.

(10) Patent No.: US 8,380,219 B1
(45) Date of Patent: Feb. 19, 2013

(54) CONTROLLING AN AMOUNT OF INFORMATION DISCLOSED BY A POSITION-DETERMINING SYSTEM

(75) Inventors: Ryan Alan Wick, Apollo Beach, FL (US); Raymond Emilio Reeves, Olathe, KS (US); John Marvin Jones, III, Overland Park, KS (US); Michael P. McMullen, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 651 days.

(21) Appl. No.: 12/409,614

(22) Filed: Mar. 24, 2009

(51) Int. Cl.
*H04W 24/00* (2009.01)
*H04M 1/66* (2006.01)
*H04M 1/68* (2006.01)
*H04M 3/16* (2006.01)
*H04M 3/42* (2006.01)
*H04M 11/04* (2006.01)
*H04L 29/06* (2006.01)
*G06F 21/00* (2006.01)

(52) U.S. Cl. ........ 455/456.1; 455/456.2; 455/456.3; 455/456.5; 455/456.6; 455/411; 455/404.2; 455/414.1; 455/414.3; 455/457; 705/51

(58) Field of Classification Search .... 455/456.1–456.6, 455/457, 414.1–414.4
See application file for complete search history.

(56) References Cited

U.S. PATENT DOCUMENTS

| 7,224,987 | B1 * | 5/2007 | Bhela et al. | 455/456.3 |
|---|---|---|---|---|
| 7,305,365 | B1 * | 12/2007 | Bhela et al. | 705/51 |
| 7,412,400 | B1 * | 8/2008 | Bhela et al. | 705/1.1 |
| 2001/0044310 | A1 * | 11/2001 | Lincke | 455/456 |
| 2004/0176104 | A1 * | 9/2004 | Arcens | 455/456.3 |
| 2007/0275732 | A1 | 11/2007 | Jethwa | |

OTHER PUBLICATIONS

3GPP TS 23.271 V8.0.0 Published Dec. 2008 3rd Generation Partnership Project; Technical Specification Group Services and System Aspects; Functional stage 2 description of Location Services (LCS) (Release 8).*

* cited by examiner

*Primary Examiner* — Dwayne Bost
*Assistant Examiner* — Nalini Yerneni (57) ABSTRACT

A method, system, and medium are provided for determining whether to allow a position-determining system to provide location information that describes a location of a mobile device. A series of steps are carried out in which information is exchanged between networked components. In an embodiment, a request for location information (e.g., map coordinates) is received together with contextual information (e.g., identification of a mobile device and identification of a requesting party). A set of rules, such as approved contextual information, is referenced to determine if the contextual information is permissible. Upon determining that the contextual information is permissible, the position-determining system is allowed to provide location information.

10 Claims, 5 Drawing Sheets

CONTROLLING AN AMOUNT OF INFORMATION DISCLOSED BY A POSITION-DETERMINING SYSTEM

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

A set of computer-useable instructions relate to determining whether to allow a position-determining system to provide to a mobile device or third-party requester location information that describes a location of a mobile device. For example, a request for location information is received together with contextual information. A set of rules is referenced to determine if the contextual information is permissible. Upon determining that the contextual information is permissible, the position-determining system is allowed to provide location information.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Embodiments of the present invention may be embodied as, among other things a method, system, or set of instructions embodied on one or more computer-readable media. Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
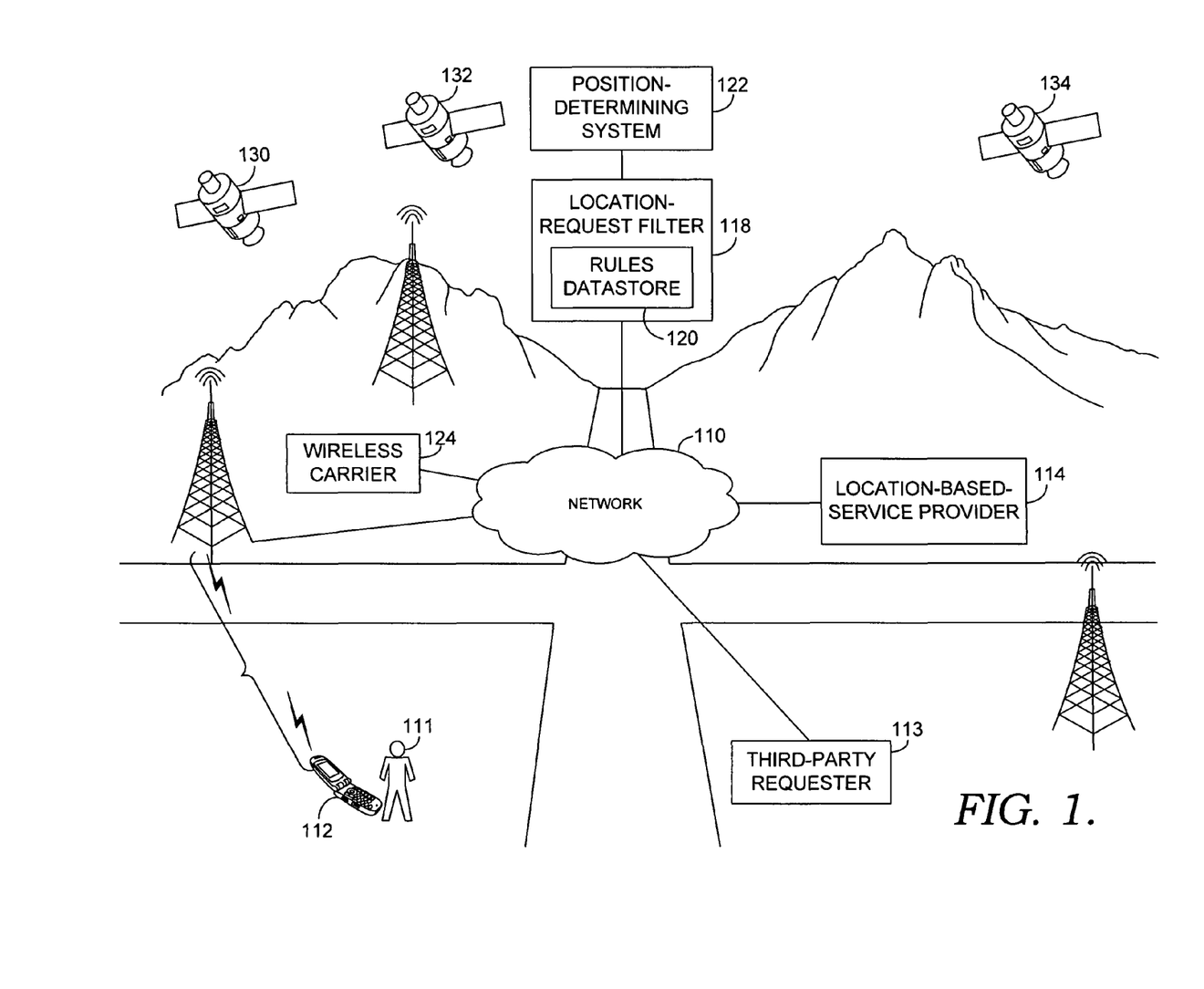
FIG. 1 depicts an illustrative operating environment suitable for practicing an embodiment of the present invention.

Referring now to FIG. 1, an illustrative operating environment is shown in which embodiments of the invention can be practiced. FIG. 1 depicts various components that are connected by way of a network 110, which enables communication among the various components. Network 110 might include various network types, such as a packet-switched network (e.g., Internet), a signaling network (e.g., SS7), or a combination thereof. The various components shown in FIG. 1 include mobile device 112, location-based-service provider 114, location-request filter 118, rule(s) datastore 120, and position-determining system 122. Also shown is wireless carrier 124, which might control position-determining system 122 and provide services (e.g., cellular wireless communication and location-based services) for mobile device 112. The components are depicted individually for illustrative purposes herein; however, one or more of the components might alternatively be combined. For example, in one embodiment one component might include positioning system 122, location-request filter 118, and rule(s) datastore 120. While location-based-service provider 114 might be controlled by wireless carrier 124, location-based-service provider 114 might also be controlled by a third-party service provider. Also shown in FIG. 1 are satellites 130, 132, and 134, which might also be in communication with mobile device 112 and/or network 110.

Components of FIG. 1 communicate by way of network 110 to carry out various functions. For example, to communicate by way of cellular wireless, mobile device 112 communicates with network 110, which places mobile device 112 in communication with one or more other mobile devices (not shown). One feature of cellular wireless networks includes an ability to locate a geographical position of mobile device 112. Once the geographical position of mobile device 112 is determined, various other types of information can be ascertained. For example, provided with a location of mobile device 112, location-based-service provider 114 (controlled by wireless carrier 124 or a third-party service provider) can provide mobile device 112 with a variety of information, such as a map displaying the location of mobile device 112; directions from the location of mobile device 112 to another destination; weather and traffic at the location of the mobile device; a list of businesses in or near the location of the mobile device 112; etc. Moreover, location-based-service provider 114 might provide location information of mobile device 112 to a third-party requester 113, e.g., family member or employer of user 111 of mobile device 112.

Location-based-service provider 114 can determine the location of mobile device 112 in various ways. In one example, location-based-service provider 114 sends a location-request message to wireless carrier 124 that serves mobile device 112. In response, carrier 124 engages a series of components to determine the location of mobile device 112. In an exemplary embodiment, carrier 124 operates position-determining system 122 that is configured to determine the location of mobile device 112. Position-determining system 122 functions to determine the location of mobile device 112 based on various factors such as identity and location of the cell/sector in which mobile station 112 is currently operating and satellite-based positioning information provided by mobile station 112. As such, position-determining system 122 often communicates via network 110 with other network components and mobile device 112 to obtain information, which enables position-determining system 122 to determine the location of mobile device 112. As used herein the term "location information" refers to information that describes a geographic position of a mobile device. Examples of location information include an address and latitude/longitude coordinates. Location information can be used to determine "location-based information," which is used herein to refer to information that describes an environment that surrounds the geographic position identified by the location information. Examples of location-based information include directions from the geographic position to another destination, a weather forecast for the geographic position, and businesses located near to the geographic position.

In embodiments of the technology, position-determining system 122 is utilized in various circumstances. In one example, mobile device 112 submits a request for location information directly to position-determining system 122. In an alternative example, if user 111 of mobile device 112 desires location-based information, a request is sent from mobile device 112 to location-based-service provider 114. In turn, location-based-service provider 114 submits a request to position-determining system 122 to receive location information. Provided with location information, location-based-service provider 114 can determine location-based information to be sent to mobile device 112. In yet another example, if third-party requester 113 (e.g., employer or family member) desires location information that describes the geographic position of mobile device 112, using location-based-service provider 114, a request is submitted by third-party requester for location information of mobile device 112.

Although requests for location information might be sent from various parties, in aspects of our technology, position-determining system 122 is only allowed to provide location information if certain conditions are satisfied. One such condition is based on information that is ascertainable from a request for location information and whether that information is permissible. An example of information that is ascertainable from a request includes contextual information. As used herein, the term "contextual information" refers to information that describes a particular request for either location information or location-based information. Examples of contextual information include indicia that identifies: a mobile device for which location information is requested, an application that is used to submit a request, a requesting party, time at which a request is received, and a location of the mobile device at the time a request is received.

In embodiments of our technology, a request for either location information or location-based information from mobile device 112 includes indicia that identifies mobile device 112. Accordingly, a condition might require that mobile device 112 be approved in order for position-determining system 122 to be allowed to provide location information. For example, an entity (e.g., wireless carrier 124) that controls position-determining system 122 might compile a list of mobile devices that are approved to submit requests for location information or location-based information, in which case, position-determining system 122 is only allowed to respond to requests that are sent from those approved mobile devices. Alternatively, a list of mobile devices that have been disapproved might also be compiled, whereby position-determining system 122 is not allowed to provide location information in response to requests sent from disapproved mobile devices. A request might also include indicia (e.g., application fingerprint) that identifies an application used by mobile device 112 to submit the request, such that a condition might require that the indicia be approved in order for position-determining system 122 to provide location information. In one aspect, an entity that controls position-determining system 122 establishes an indicia that identifies an application, which has been approved by the entity to submit requests for location information. As such, the entity has an ability to allow position-determining system 122 to provide location information only when an application is approved, as evidenced by the indicia that has been established by the entity.

Other types of information are ascertainable from a request for location information or location-based information. For example, the time at which a request is received can be determined. As such, another condition might require that in order for position-determining system 122 to provide location information, requests must be received either during approved time frames or outside a range of nonapproved time frames. As previously described, wireless carrier 124 (or some other controlling entity) might establish exclusionary time frames during which it does not allow position-determining system 122 to provide location information. Furthermore, a user of mobile device 112 might establish exclusionary time frames (9:00 PM through 6:00 AM) during which she does not want location information that describes a position of mobile device 112 to be provided to third-party requester 113. In a further aspect, a request also includes indicia that identifies the requesting party, such that a condition might require that the requesting party be approved (or not disapproved) to submit a request. For example, either a user of mobile device 112 or wireless carrier 124 might establish a list of approved or disapproved requesting parties.

In other aspects of our technology, a request includes approximate-location information. As used herein, "approximate-location information" includes information that describes geographical boundaries in which mobile device 112 is located. Examples of approximate-location information include an identification of a cell/sector coordinate in which mobile device 112 is operating or an identification of satellites from which mobile device 112 is receiving a signal. Accordingly, one condition to be met before position-determining system 122 is allowed to provide location information might require that mobile device 112 be operating in an approved geographic location or not be operating in a nonapproved geographic location. For example, a user of mobile device 112 might specify that he does not want location information, which describes a geographic position of mobile device 112, to be provide when mobile device 112 is operating in a nonapproved mobile-device location, e.g., at a golf course.

FIG. 1 depicts location-request filter 118, which includes rules datastore 120. Location-request filter 118 is positioned such that requests for location information are received by location-request filter 118 prior to being submitted to position-determining system 122. Accordingly, requests can be evaluated by location-request filter 118 to determine if position-determining system 122 should be allowed to provide location information. In one embodiment, requests are evaluated by comparing information (e.g., contextual information) that is ascertainable from the request to information in rules datastore 120.

In embodiments of the invention, rules datastore 120 includes information that is usable to determine if contextual information is permissible. For example, rules datastore 120 includes a list of mobile devices that have been approved to submit requests for location information or that have been approved to be the subject of a request for location information. Furthermore, rules datastore 120 includes a list of approved requesting parties, which have been approved to submit requests for location information. Rules datastore 120 might also include a list of time frames during which position-determining system 122 is either allowed to provide location information or not allowed to provide location information. In another embodiment, rules datastore 120 includes an application fingerprint, or other application indicia, that identifies an application that has been approved to submit requests for location information. As such, position-determining system 122 would only be allowed to respond if the requesting application contained the approved application fingerprint. In another aspect, rules datastore 120 includes a list of mobile-device locations that have either been approved or not approved, such that when mobile device 112 is in a nonapproved mobile-device location, position-determining system 122 will not be allowed to provide location information.

Figure 2:
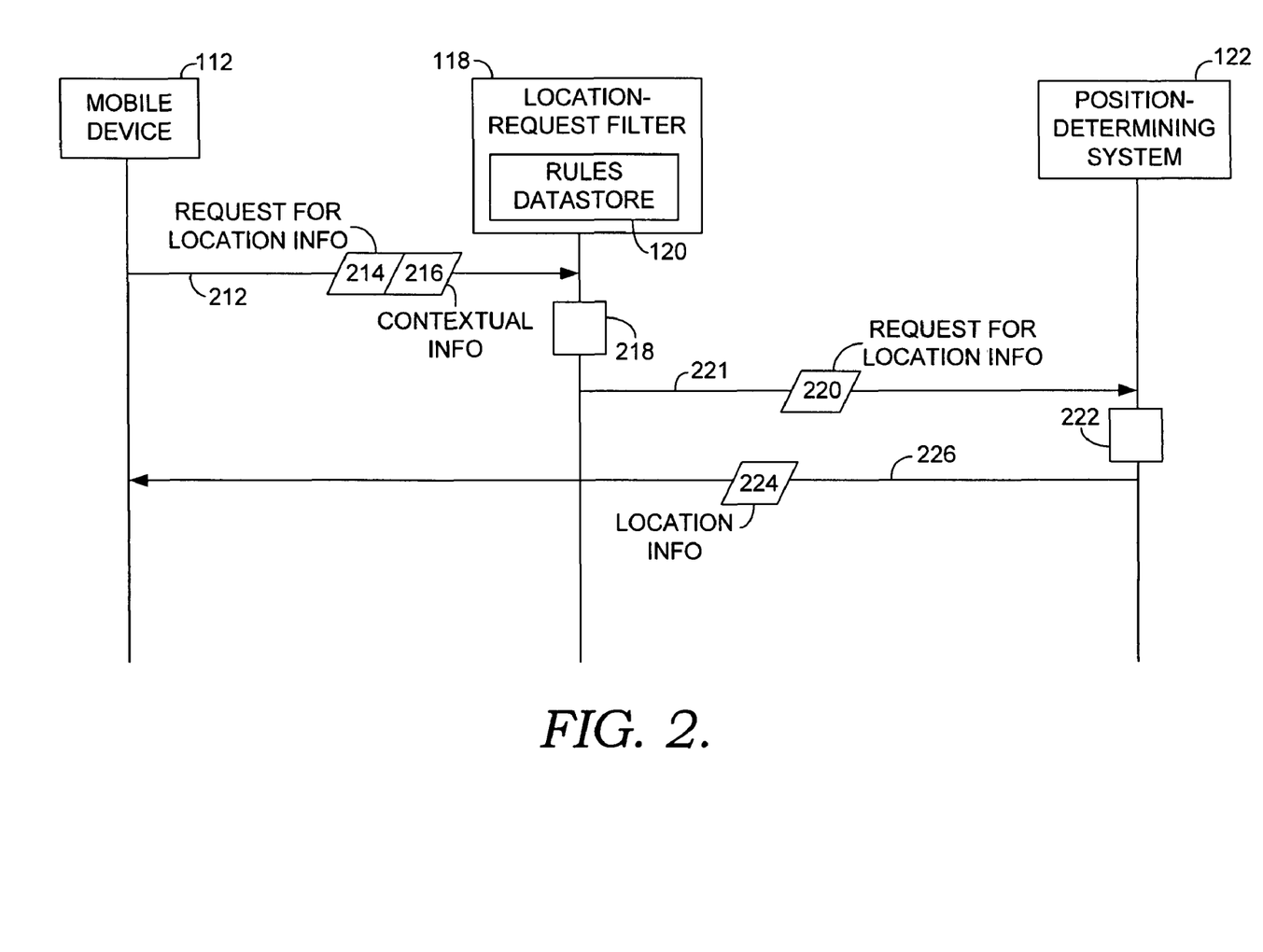
FIGS. 2-5 each depict an illustrative method of determining whether to allow a position-determining system to provide location information in accordance with an embodiment of the present invention.

Turning now to FIG. 2, an illustrative flow diagram depicts an aspect of our technology. Pursuant to FIG. 2, at step 212 mobile device 112 submits a request 214 for location information, request 214 being submitted together with contextual information 216. Location-request filter 118 receives request 214 and contextual information 216 and references 218 rules datastore 120 to determine if contextual information 216 is permissible. For example, if contextual information 216 includes indicia that identifies mobile device 112, location request filter 118 determines if the indicia that identifies mobile device 112 is listed in rules datastore 120 as an approved mobile device (or disapproved mobile device). Moreover, contextual information 216 might include indicia (e.g., application fingerprint) that identifies an application used to submit request 214, such that the application can be verified using the rules datastore 120. The location-request filter 118 might also establish a time at which request 214 is received, such that approved and nonapproved timeframes could be referenced in rules datastore 120 to determine if the time of receipt is permissible. (As previously indicated, an entity (e.g., wireless carrier) that controls position-determining system 122 might establish a list of approved mobile devices, applications, and time frames.) Upon determining that contextual information 216 is permissible, at step 221 request 220 is forwarded to position-determining system 122. Position-determining system 122 determines 222 location information 224, which is ultimately communicated to mobile device 112 at step 226.

Figure 3:
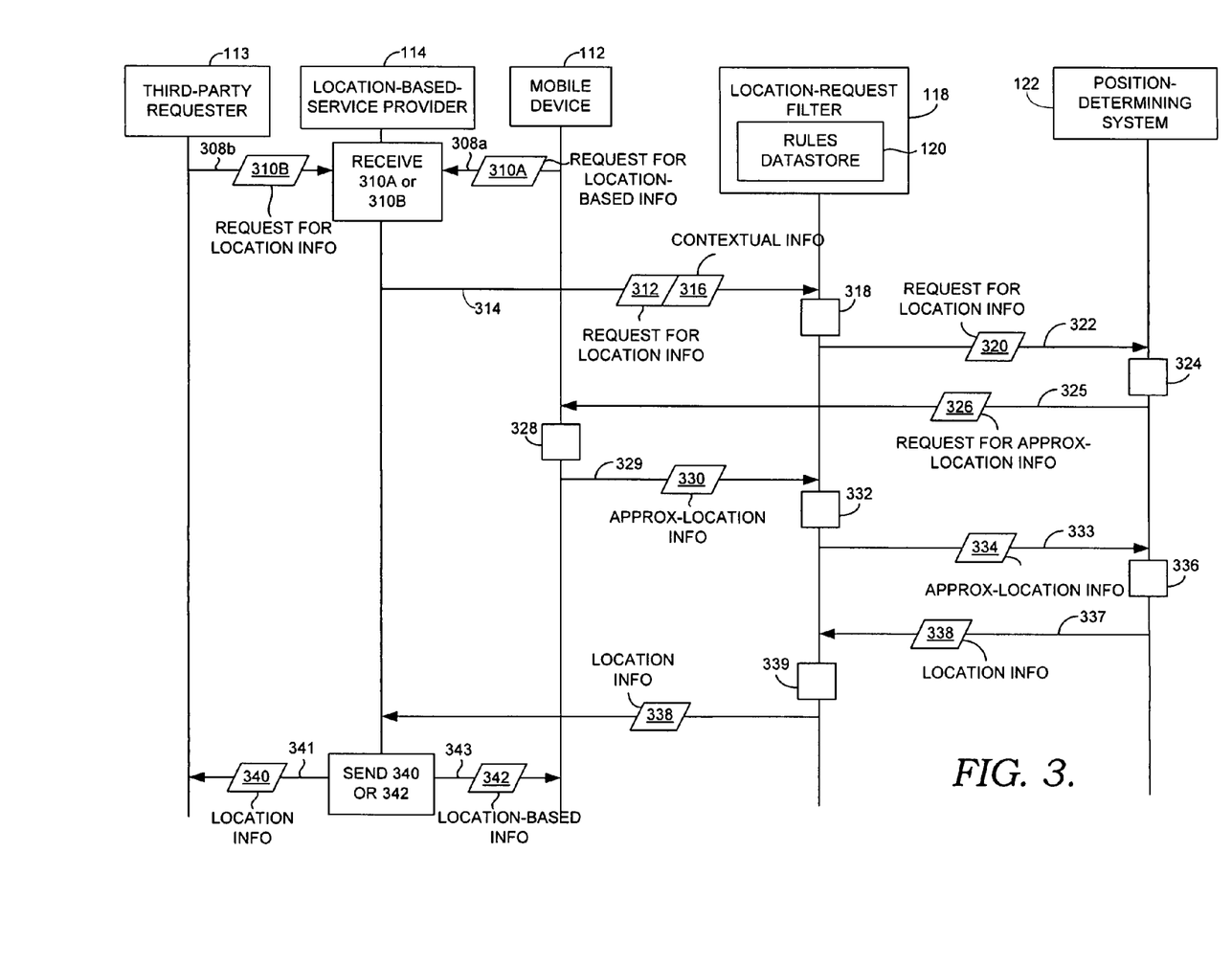

FIG. 3 displays another aspect of our technology in which at step 314 a request 312 for location information is submitted by location-based-service provider 114. Request 312 can be prompted by various triggering events 310a or 310b. For example, at step 308a location-based-service provider 114 might have received a request 310a from mobile device 112 for location-based information (e.g., driving directions). Alternatively, at step 308b location-based-service provider 114 might have received a request 310b from a third-party requester 113 (e.g., employer of user of mobile device 112) for location information pertaining to mobile device 112. Request 312 includes contextual information 316, such as indicia identifying the requester, mobile device, and application submitting the request. Moreover, additional contextual information, such as the time at which request 312 is received, might be ascertained by the location-request filter 118.

After receiving request 312, location-request filter 118 determines if contextual information 316 is permissible by referencing 318 rules datastore 120. Upon determining that contextual information 316 is permissible, request 320 is forwarded at step 322 to position-determining system 122. (In FIG. 3, although a request is identified with two different numerals 312 and 320, this is the same request. Two different numerals are used for illustrative purposes to distinguish between request 312 before being received by location-request filter 118 and request 320 after being forwarded to position-determining system 122.)

Upon receiving request 320, position-determining system 122 processes 324 request 320 and sends 325 to mobile device 112 a request 326 for approximate-location information. Mobile device 112 determines 328 approximate-location information 330 (e.g., cell/sector) and responds in-kind by communicating approximate-location information 330.

Approximate-location information 330 is received by location-request filter 118. Location-request filter 118 references 332 rules datastore 120 to determine if approximate-location information 330 is permissible. For example, rules datastore 120 might include a list of nonapproved mobile-device locations, whereby if a nonapproved mobile-device location is located within approximate-location information 330, position-determining system 122 is not allowed to provide location information. Upon determining that approximate-location information 330 is permissible, approximate-location information 334 is forwarded 333 to position-determining system 122.

Using approximate-location information 330, position-determining system 122 determines 336 location information 338. In one aspect of the technology, location information 338 is communicated directly to location-based-service provider 114. However, in an alternative aspect, location information 338 is sent 337 to location-request filter 118 and again verified 339 by location-request filter 118, such as by comparing location information to approved and nonapproved mobile-device locations. After verification, location information 338 can then be forwarded to location-based-service provider 114. Provided with location information 338, location-based-service provider 114 can take appropriate action depending on the nature of triggering event 310a or 310b. For example, if triggering event 310b had been received from a third-party requester 113, at step 341 location-based-service provider 114 might communicate location information 340 to third party requester 113. However, if triggering event 310a had been received (from mobile device 112), location-based-service provider 114 might use location information 338 to generate location-based information 342 (e.g., driving directions), which is then forwarded on to mobile device 112 at step 343.

Figure 4:
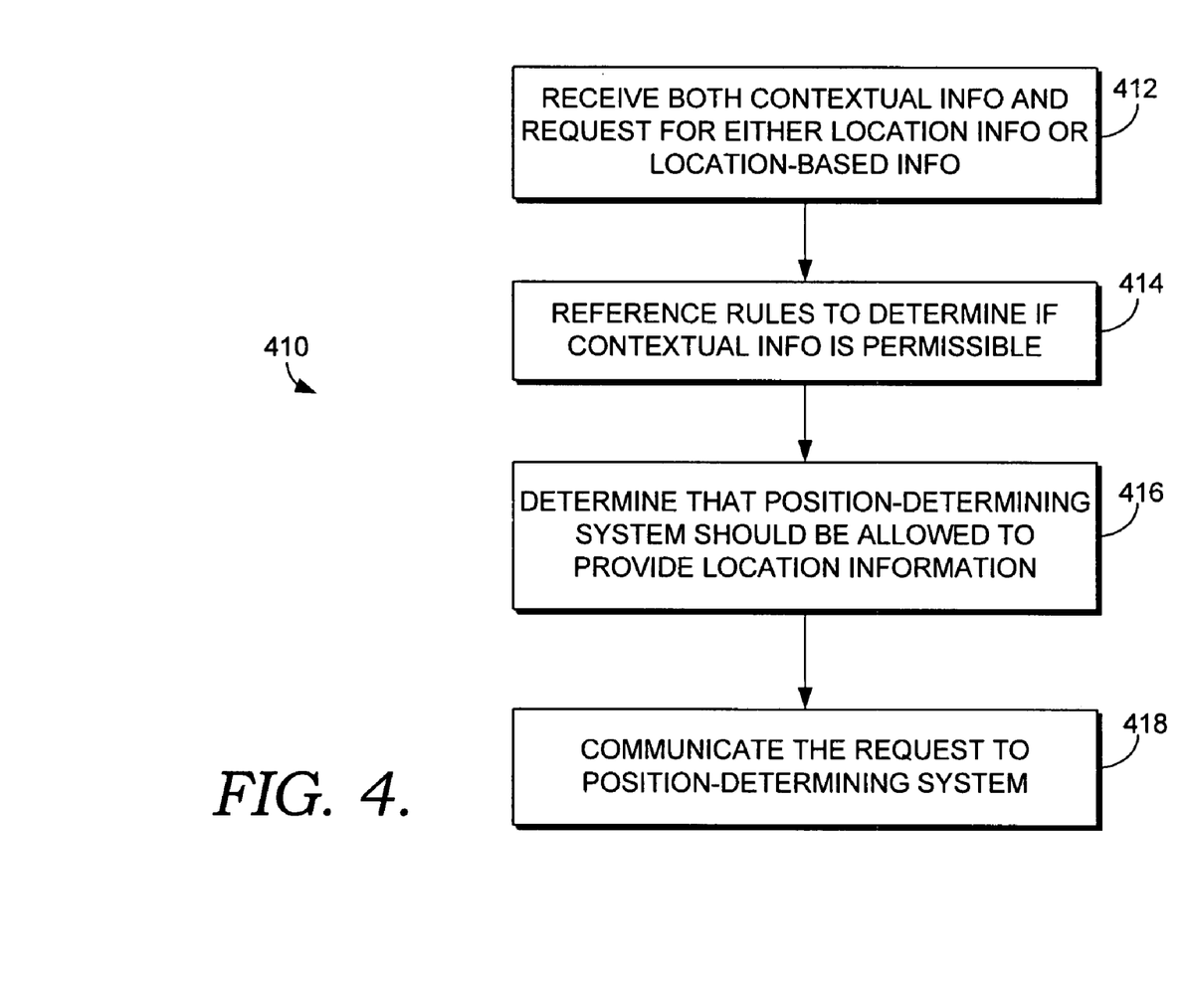

Referring now to FIG. 4, an illustrative method (identified generally by numeral 410) is depicted pursuant to an aspect of our technology. Method 410 is directed to determining whether to allow a position-determining system to provide location information that describes a location of a mobile device. Step 412 includes receiving either a request for location-based information (e.g., weather or traffic at current position of the mobile device) or a request for location information. For example, a request for location-based information might be received from a mobile device and a request for location information might be received from a requesting party (e.g., mobile device or location-based-service provider). Step 412 also includes receiving contextual information (e.g., indicia of mobile device, requesting application, requesting party, and time of request) together with the request. Step 414 includes referencing a set of rules (e.g., approved mobile devices, approved requesting applications, approved requesting parties, and approved time frames) to determine if the contextual information is permissible. At step 416 a determination is made that the position-determining system should be allowed to provide location information, such as the case in which contextual information is permissible. At step 418 the request is communicated to the position-determining system to allow the position-determining system to provide contextual information. Once location information is determined by the position-determining system, alternative steps might be taken depending on the nature of the initial request. For example, where a request was for location information, the location information can be communicated to the requesting party. However, where a request was for location-based information, the location information can be used to derive location-based information, which is then communicated to the requesting party.

Figure 5:
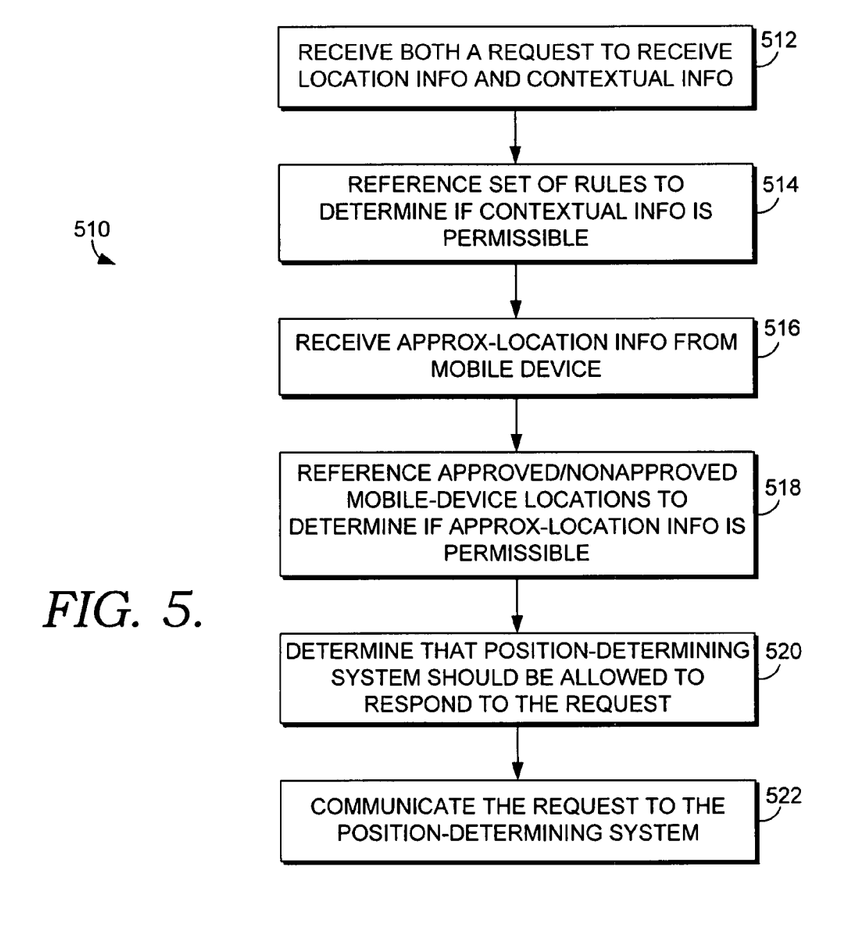

Referring now to FIG. 5, another illustrative method (identified generally by numeral 510) is shown consistent with an aspect of our technology. Method 510 is directed to determining whether to allow a position-determining system to respond to a request to receive location information that describes a location of a mobile device. Step 512 includes receiving both a request to receive the location information and contextual information. For example, the request might be received from a location-based-service provider. At step 514 a set of rules is referenced in order to determine whether the contextual information is permissible. Moreover, approximate-location information is received from the mobile device at step 516 and step 518 includes referencing approved and nonapproved mobile-device locations in order to determine whether the approximate-location information is permissible. Based on a determination that both the contextual information and approximate-location information is permissible, step 520 includes determining that the position-determining system should be allowed to respond to the request. At step 522 the request is communicated to the position-determining system to allow the position-determining system to provide the location information. As another measure of verification, the location information might also be compared to approved and nonapproved mobile-device locations to determine whether the location information is permissible before the location information is provided to the location-based-service provider.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-useable instructions embodied thereon that, when executed, perform a method of determining whether to allow a position-determining system to provide location information that describes a location of a mobile device, the method comprising:
   receiving by a network location-request filter a request, which is transmitted from the mobile device, to receive location-based information that describes a surrounding environment of the mobile device and that is generated using the location information,
      wherein the request includes an indicia identifying an application that is running on the mobile device and that generates the request, and
      wherein the request is received by the network location-request filter at an instant in time;
   comparing the indicia to a list of approved indicia to determine whether the application running on the mobile device is approved to request the location information from the position-determining system;
   comparing the instant in time to a network-approved time frame to determine whether the instant in time is included within the network-approved time frame;
   communicating the request to the position-determining system when the indicia matches an approved indicia and the instant in time is included within the network-approved time frame, thereby allowing the position-determining system to provide the location information, wherein the request is denied if either the indicia does not match any approved indicia or the instant in time is not included within any network-approved time frame; and
   based on the location information provided by the position-determining system, deriving location-based information to be communicated to the mobile device.

2. The media of claim 1,
   wherein the request includes identifying indicia of the mobile device,
   wherein the identifying indicia is compared to a list of approved mobile devices, each of which has been approved to be a subject of a request for location information, and
   wherein the request is denied when the identifying indicia does not match any approved mobile device.

3. The media of claim 1, wherein the method further comprises comparing the instant in time to a network-unapproved time frame, and denying the request when the instant in time is included within the network-unapproved time frame.

4. Non-transitory computer-readable media having computer-useable instructions embodied thereon that, when executed, perform a method of determining whether to allow a position-determining system to respond to a request to receive location information that describes a location of a mobile device, the method comprising:
   receiving by a network location-request filter a request, which is received from a location-based services provider, to receive the location information describing a location of the mobile device,
      wherein the request includes an indicia identifying an application used by the location-based services provider to generate the request, and
      wherein the request is received by the network location-request filter at an instant in time;
   comparing the indicia to a list of approved indicia to determine whether the application running on the mobile device is approved to request the location information from the position-determining system;
   comparing the instant in time to a network-approved time frame to determine whether the instant in time is included within the network-approved time frame; and
   communicating the request to the position-determining system when the indicia matches an approved indicia and the instant in time is included within the network-approved time frame, thereby allowing the position-determining system to provide the location information to the location-based service provider, wherein the request is denied when either the instant in time is not included within any network-approved time frame or the indicia does not match any approved indicia.

5. The media of claim 4,
   wherein the request includes identifying indicia of the mobile device,
   wherein the identifying indicia are compared to a list of approved mobile devices, each of which has been approved to be a subject of a request for location information, and wherein the request is denied when the identifying indicia does not match any approved mobile device.

6. The media of claim 4, wherein the method further comprises comparing the instant in time to a network-unapproved time frame, and denying the request when the instant in time is included within the network-unapproved time frame.

7. The media of claim 4 further comprising,
requesting by the network location-request filter an approximate location of the mobile device, wherein the network location-request filter uses the approximate location to determine whether the request is allowable.

8. The media of claim 7, wherein the network location-request filter compares the approximate-location information to a set of nonapproved mobile-device locations.

9. The media of claim 8, wherein the set of nonapproved mobile-device locations are established by a user of the mobile device and the network-approved time frame is established by the network, such that the network location-request filter references settings established by both the network and the user.

10. Non-transitory computer-readable media having computer-useable instructions embodied thereon that, when executed, perform a method of determining whether to allow a position-determining system to respond to a request to receive location information that describes a location of a mobile device, the method comprising:
receiving, by a network location-request filter, a request to send location information, wherein the request is received from a location-based-service provider, and wherein the request is received at an instant in time and includes indicia that identifies an application used by the location-based-service provider to generate the request;
comparing the indicia to a list of approved indicia and the instant in time to a network-approved time frame to determine that the request is allowable, wherein the request is denied when either the instant in time is not included within any network-approved time frame or the indicia does not match any approved indicia;
sending a request to the mobile device to send approximate-location information, which describes geographical boundaries in which the mobile device is located;
receiving, by the network location-request filter, the approximate-location information, which is received from the mobile device, wherein the network location-request filter compares the approximate-location information to a list of unapproved mobile-device locations; and
communicating the request to the position-determining system when the approximate-location information is not included among the list of unapproved mobile-device locations, thereby allowing the position-determining system to provide the location information to the location-based-service provider, wherein the network-approved time frame is established by a network entity, and wherein the list of unapproved mobile-device locations are established by a user of the mobile device, such that the network location-request filter references settings established by both the network entity and the user.

* * * * *